(12) United States Patent
Syers

(10) Patent No.: US 6,994,618 B1
(45) Date of Patent: Feb. 7, 2006

(54) PORTABLE GAME GALLOWS FOR HOISTING AND SKINNING MULTIPLE GAME

(76) Inventor: Jack Allen Syers, 1410 Houston Dr. West, La Marque, TX (US) 77568

( * ) Notice: Subject to any disclaimer, the term of this patent is extended or adjusted under 35 U.S.C. 154(b) by 0 days.

(21) Appl. No.: 10/968,855

(22) Filed: Oct. 19, 2004

(51) Int. Cl.
*A22B 1/00* (2006.01)

(52) U.S. Cl. .................................................. 452/187

(58) Field of Classification Search ............... 212/180, 212/294, 299; 414/462, 540, 541–543; 452/187; 254/329, 332, 334; 294/81.1–81.5, 81.51, 294/19.1, 19.3, 24, 67.1–67.3, 67.31, 67.32
See application file for complete search history.

(56) References Cited

U.S. PATENT DOCUMENTS

| | | | | |
|---|---|---|---|---|
| 1,214,104 | A | * | 1/1917 | Wingire ..................... 254/334 |
| 4,860,404 | A | * | 8/1989 | Flachs ........................ 452/187 |
| 5,049,110 | A | | 9/1991 | Owens |
| 5,226,505 | A | | 7/1993 | Weller et al. |
| 5,263,675 | A | | 11/1993 | Roberts et al. |
| 5,304,091 | A | | 4/1994 | Wilkinson |
| 5,395,284 | A | | 3/1995 | Frisk |
| D358,696 | S | | 5/1995 | Mims |
| 5,413,192 | A | | 5/1995 | Weller et al. |
| 5,417,609 | A | | 5/1995 | Oldham |
| 5,562,534 | A | * | 10/1996 | McGough .................. 452/187 |
| 5,588,907 | A | | 12/1996 | DePietro et al. |
| 5,699,991 | A | | 12/1997 | Melinyshyn |
| 5,820,455 | A | | 10/1998 | Breedlove |
| 5,979,603 | A | | 11/1999 | Woller |
| 6,045,442 | A | | 4/2000 | Bounds |
| 6,062,974 | A | | 5/2000 | Williams |
| 6,089,431 | A | | 7/2000 | Heyworth |
| D431,890 | S | | 10/2000 | Twilligear et al. |
| 6,138,991 | A | | 10/2000 | Myers, Jr. |
| 6,155,771 | A | | 12/2000 | Montz |
| 6,250,483 | B1 | * | 6/2001 | Frommer .................... 212/180 |
| 6,296,559 | B1 | | 10/2001 | Kinnebrew |
| 6,481,694 | B2 | * | 11/2002 | Kozak ......................... 254/325 |
| 6,554,254 | B2 | * | 4/2003 | Vetesnik ..................... 254/325 |
| 6,626,748 | B2 | | 9/2003 | Homer, Sr. |
| 6,682,412 | B2 | | 1/2004 | Hendrix |
| 6,695,688 | B1 | * | 2/2004 | Owen et al. ................ 452/187 |
| 6,705,821 | B2 | * | 3/2004 | Philipps et al. ............ 414/462 |
| 6,739,964 | B2 | * | 5/2004 | Gearhart ..................... 452/187 |

* cited by examiner

*Primary Examiner*—Thomas Price
(74) *Attorney, Agent, or Firm*—Streets & Steele; Frank J. Campigotto; Patrick K. Steele

(57) ABSTRACT

The present invention discloses portable game gallows for hoisting and skinning multiple game. The portable game gallows includes a winch having a strap or cable that can be used to raise game into position for hanging on a rotating tree and for skinning game that is hung from the tree. The present invention discloses a dual purpose pulley that can be locked into a first position for hoisting a game or a second position for skinning a game.

12 Claims, 5 Drawing Sheets

# PORTABLE GAME GALLOWS FOR HOISTING AND SKINNING MULTIPLE GAME

BACKGROUND OF THE INVENTION

1. Field of the Invention

The present invention relates to the hunting of wild game and, in particular, to a portable device for the hoisting and skinning of wild game in the field.

2. Description of the Related Art

Hunters have hunted, killed and skinned wild game since before recorded history. The skinning and dressing of game in the field is best done when the game is hoisted off of the ground into a hanging position with either the head of the game elevated and the rear legs hanging down, or with the rear legs elevated and the head and the front legs hanging down. Game can be long and heavy, so it is necessary that the game be hoisted to a sufficient height to enable a person to manipulate the game as necessary to remove the skin without the game dragging on the ground.

Numerous patents disclose vehicle mounted, tree depending and free standing game hoists. Game hoists are generally used in remote areas and have to be transported to the location of use. Portability is a key factor for game hoists to be used in the field. Tree depending game hoists utilize a tree for structural support, while free standing game hoists generally require a rigid support which may add to the weight of the device. Vehicle depending game hoists are generally similar to free standing devices but are adapted to be supported by a trailer hitch or other component of the motor vehicle.

Several inventions are known to those skilled in the art for hoisting killed game into position for skinning. U.S. Pat. No. 5,562,534 ("the '534 patent") discloses a game hoist having a dual-purpose winch. The '534 patent also discloses a first pulley used with the winch for hoisting game and a second pulley used with the winch for skinning game. After the game is hoisted to a hanging position, the game is secured in the hanging position and the winch is used, in combination with a second pulley, to pull the skin of the game.

The '534 patent is a tree depending hoist and requires the user to find a tree having a trunk suitable for receiving straps or chains used to secure the winch, the first pulley and the second pulley. Tree depending game hoists generally require a tree having an uninterrupted section of trunk with no limbs and a diameter within a certain range.

A problem with tree depending hoists like the one disclosed in the '534 patent is that a ladder may be required in order to secure the hoist to the tree at a height sufficient to prevent hoisted game from contacting the ground during skinning process.

Another problem with tree depending game hoists like the one disclosed in the '534 patent is that the second pulley is secured to the trunk of a tree instead of being strategically positioned directly underneath the hoisted game. This may cause the game to be pulled in a direction other than straight down, and the game may swing or spin during or after the skinning process. Also, the game hoist disclosed in the '534 patent may not be usable if the tree does not have a extended portion of suitable diameter trunk near the ground that is without limbs or other naturally occurring features that may prevent the attachment and use of the lower pulley.

Another problem with game hoists like the one disclosed in the '534 patent is the requirement of a second pulley. The user must unthread the strap or cable from the first pulley after hoisting the game, and then thread the strap or cable around the second pulley for skinning the game. This manipulation of the strap or cable may be time consuming and difficult, especially in cold weather when the manual dexterity of the user's hands is impaired by cold or by gloves. Also, the requirement of the second pulley adds unnecessary weight to the device.

Another problem with game hoists like the one disclosed in the '534 patent is that it supports only a single game, and will not accommodate multiple game. Hunters that hunt in groups would each need to bring their own individual game hoist or they would have to skin one game at a time while other game lay on the ground attracting insects or scavengers.

Another problem with game hoists like the one disclosed in the '534 patent is that it does not assist the user in loading skinned game into a truck or onto a motor vehicle unless the vehicle can be positioned under the tree to which the device is secured.

What is needed is a game gallows for hoisting and skinning game that is more portable for easier transport to the field. What is needed is a game gallows that allows the user to hoist and skin the game without removing the strap or cable from a hoisting pulley and rethreading the strap or cable over a skinning pulley. What is needed is a game gallows for simultaneously hoisting and skinning multiple game. What is needed is a game gallows that is suitable for loading game into the bed of a truck or onto a motor vehicle.

SUMMARY OF THE INVENTION

The present invention provides a device for skinning game that overcomes the disadvantages in the prior art. The present invention provides a game gallows for skinning game that is suitable for being supported by a vehicle or for use as a free standing gallows. The present invention provides a game gallows that allows the simultaneous processing (dressing or skinning) of multiple game. The present invention provides a game gallows that does not require the user to remove and rethread straps or cables around different pulleys.

The present invention includes a support and a rotatable hanger assembly. The hanger assembly is designed to accommodate a plurality of killed game and has a generally vertical axis of rotation. The support has a pulley arm pivotally coupled to the support for rotation in a generally vertical plane. In one embodiment, the first leg of the pulley arm is pivotally coupled to the support, and the second leg of the pulley arm extends generally perpendicular from the first leg and is coupled to a pulley. The first leg of the pulley arm also has a winch for pulling a strap or cable that passes around the pulley into tension. The pulley arm pivots between a superior position, with the second leg and the pulley secured into a position near the hanger assembly, and an inferior position, with the second leg and the pulley secured into a position near the ground. The winch operatively engages a strap or pulley that is threaded around the pulley for pulling in a generally vertical direction: upwardly when the second leg and pulley are secured into the superior position near the hanger assembly (for hoisting), and downwardly when the second leg and pulley are secured into the inferior position near the ground (for skinning). With the pulley arm in the superior position, the winch pulls the strap or cable to hoist game into a hanging position for hanging the game onto one of the hangers on the hanger assembly. With the pulley arm in the inferior position, the winch pulls the strap or cable to skin a game that is secured to and hanging on a hanger.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are, therefore, not to be considered limiting of its scope, for the invention may admit to other equally effective embodiments.

DETAILED DESCRIPTION OF THE INVENTION

Figure 1:
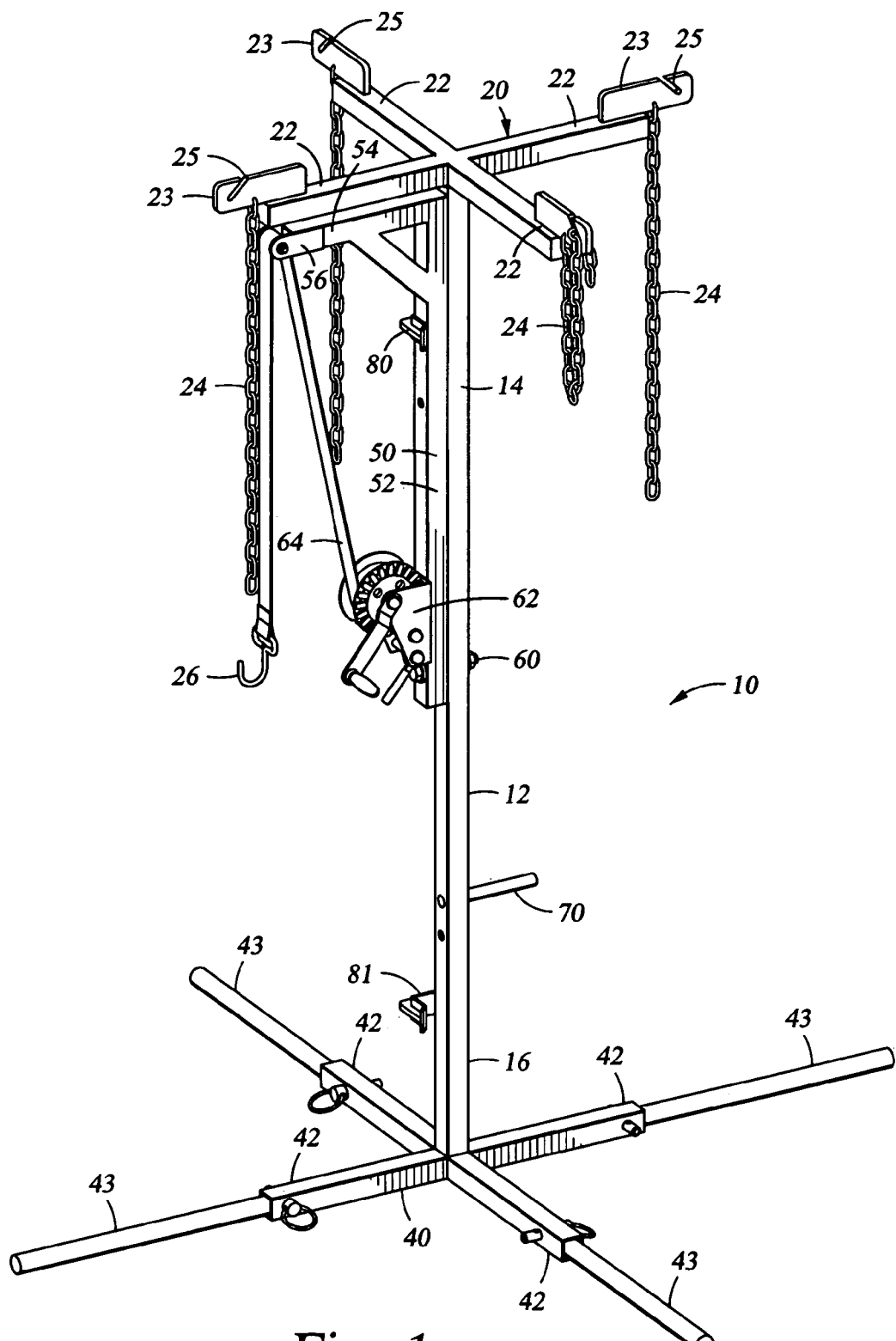
FIG. 1 is a perspective view of the game gallows of the present invention with the pulley arm in the hoisting position.

FIG. 1 is a perspective view of one embodiment of the game gallows of the present invention. The embodiment of the game gallows 10 depicted in FIG. 1 comprises a support 12 having a first end 14 and a second end 16, a rotatable hanger assembly 20 that is rotatably coupled to the first end 14 of the support 12. The hanger assembly 20 has a plurality of radially outwardly extending hangers 22, each of which can support a game. Each hanger 22 has a chain plate 23 coupled along the top of the hanger 22, and each chain plate 23 has a link channel 25 of a width slightly greater than the diameter of the links of the chain 24 that is secured to the chain plate 23. The chain 24 can be secured to a game (not shown) by inserting a link of the chain 24 into the link channel 25 of the chain plate 23 as shown on FIG. 1.

In the embodiment shown in FIG. 1, a base 40 is coupled to the second end 16 of the support 12. FIG. 1 shows a base 40 having a plurality of radially outwardly extending legs 42 that generally lie in a horizontal plane. Preferably, the legs 42 may have a one to three degree downwardly slope from center to end to provide additional stability when placed upon soft ground. The embodiment of the game gallows 10 is depicted in FIG. 1 further comprises radially outwardly telescoping leg extenders 43. Deployment of the leg extenders 43, as shown in FIG. 1, improves stability of the game gallows 10.

The embodiment of the game gallows 10 depicted in FIG. 1 further comprises a pulley arm 50 having a first leg 52 and a second leg 54, the first leg 52 being pivotally coupled to the support 12 at a pivot 60. The first leg 52 of the pulley arm 50 is also coupled to a winch 62 having a strap 64 rolled onto a spool. The second leg 54 of the pulley arm 50 extends generally perpendicular to the first leg 52 and is coupled to a pulley 56 around which the strap 64 is threaded. "Strap," as that term is used herein, refers to a strap, wire, rope, cable or any other elongated flexible tether suitable for use with a winch. The winch 62 may be any suitable means of reeling in and storing, unreeling and feeding out, and locking strap. Alternately, a winch having a gear sprocket can utilize a chain. A Fulton Performance Products, Inc. (of Mosinee, Wis.) Trailer Winch model T903, 900 pound capacity is preferred. The pulley 56 shown in FIG. 1 comprises a tubular hollow shaft rotatable on an axle received into its hollow interior.

The support 12 may have a plurality of foot pegs 70 welded onto the support 12 and generally perpendicular to the support 12. The pegs 70 are located between the pivot 60 and the second end 16 of the support 12. The foot pegs 70 enable the user to climb the support 12 to reach the hangers 22 of the hanger assembly 20 or the chains 24 hanging on the hangers 22.

The game gallows 10 further comprises retainer 80 for engaging the pulley arm 50 and securing the pulley arm in the hoisting position. The game gallows 10 further comprises a lower retainer 81 for engaging the pulley arm 50 and for securing the pulley arm 50 in the skinning position. The upper retainer 80 allows the pulley arm 50 to be secured in the hoisting position (FIG. 1), and the lower retainer 81 allows the pulley arm 50 to be secured in the skinning position (FIG. 2).

Figure 2:
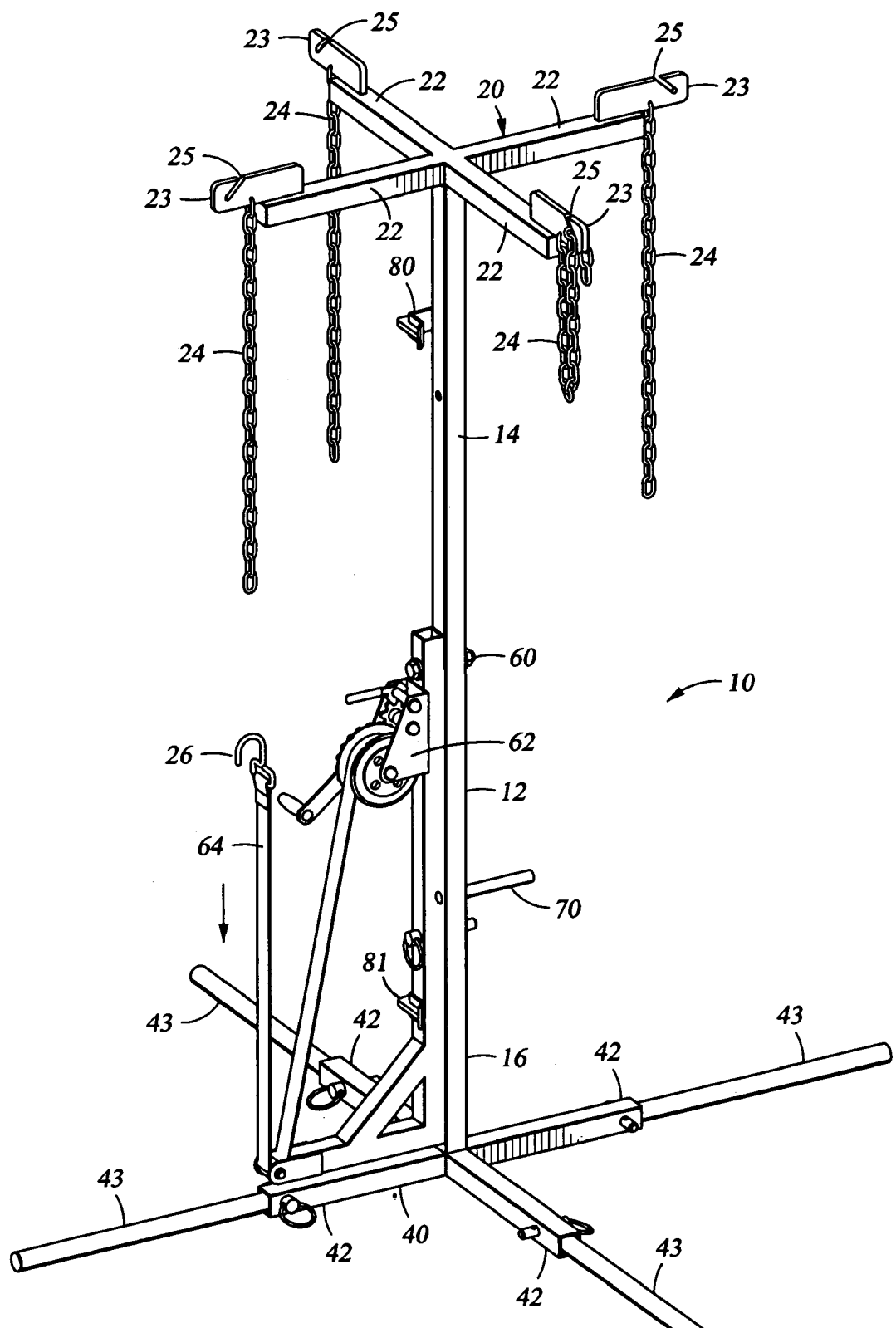
FIG. 2 is a perspective view of the game gallows of the present invention with the pulley arm in the skinning position.

As shown in FIGS. 1 and 2, each hanger 22 may include a chain 24. A hanging tool, such as a collar or a gambrel (not shown), is fitted or secured around the head or coupled to the rear legs of a game (not shown), respectively, and is used to couple the game to the hook 26 on the strap 64 to hoist the game into position using the winch 62.

Figure 3:
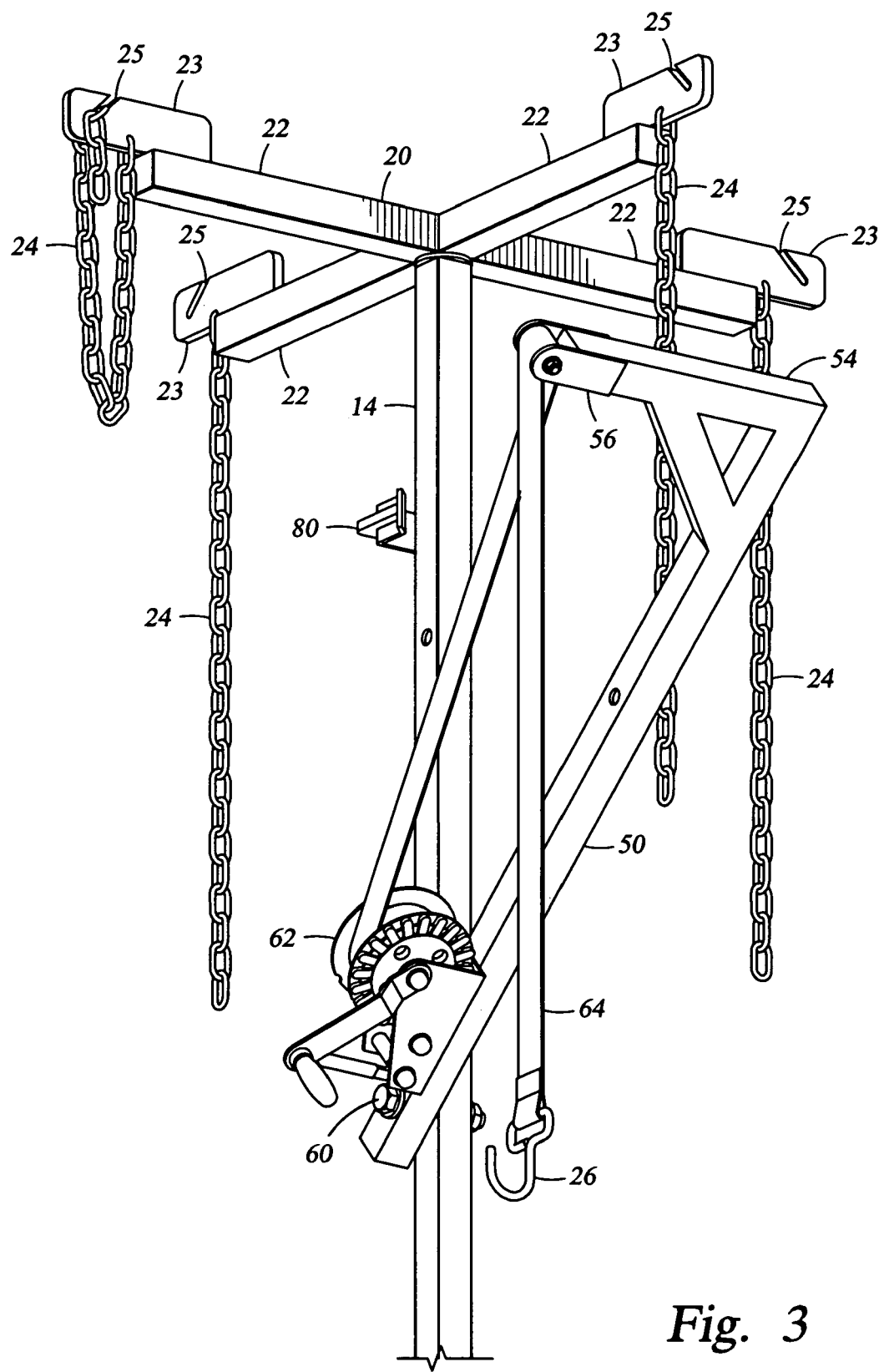
FIG. 3 is a perspective view of the game gallows of the present invention with the pulley arm rotating from the hoisting position to the skinning position.

FIG. 3 is a perspective view of the game gallows 10 of the present invention with the pulley arm 50 rotating from the hoisting position (shown in FIG. 1) to the skinning position shown in FIG. 2. The pulley arm 50 is shown in FIG. 3 to be rotating about the pivot 60 away from the upper retainer 80 in a clockwise direction, and will continue to rotate until it reaches the skinning position shown in FIG. 2 and is received into and secured by the lower retainer 81 (shown in FIG. 2).

Figure 4:
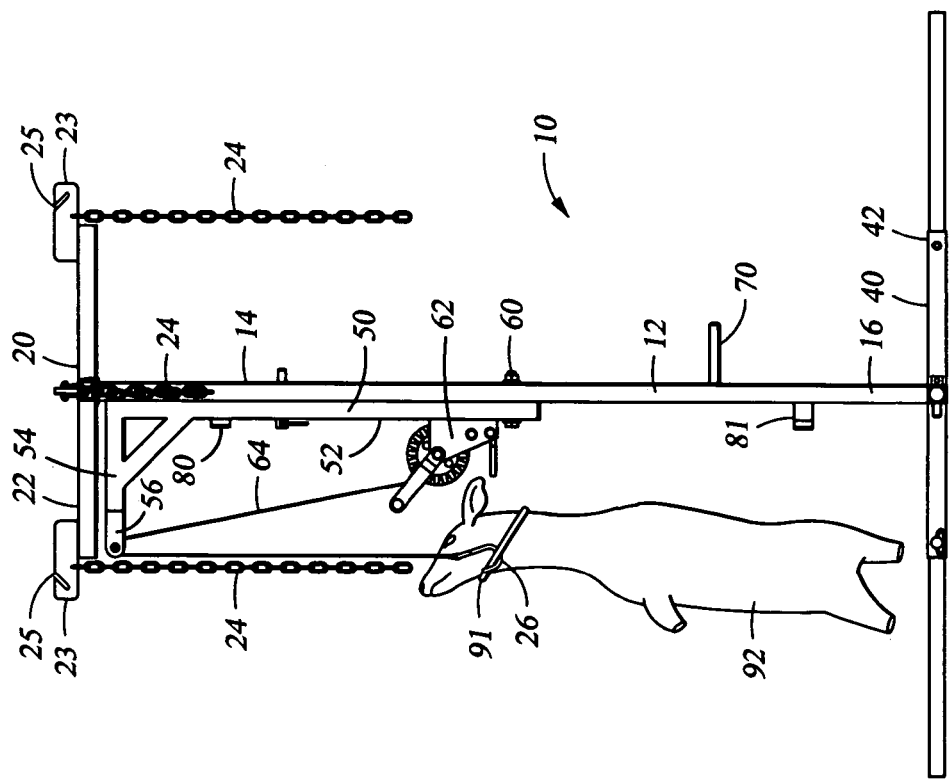
FIG. 4 is an elevational view of the dismembered killed game being hoisted to a hanging position using the game gallows of the present invention.

FIG. 4 is an elevational view of a first dismembered game 92 being hoisted to a hanging position using the game gallows 10 of the present invention. The game 92 is secured to the strap 64 by the hook 26 that is coupled to the end of the strap 64. The hook 26 engages the collar 91 that is secured around the neck of the game 92, and the winch 62 is operated to reel in and pull tension in the strap 64 that is threaded over the pulley 56.

Figure 5:
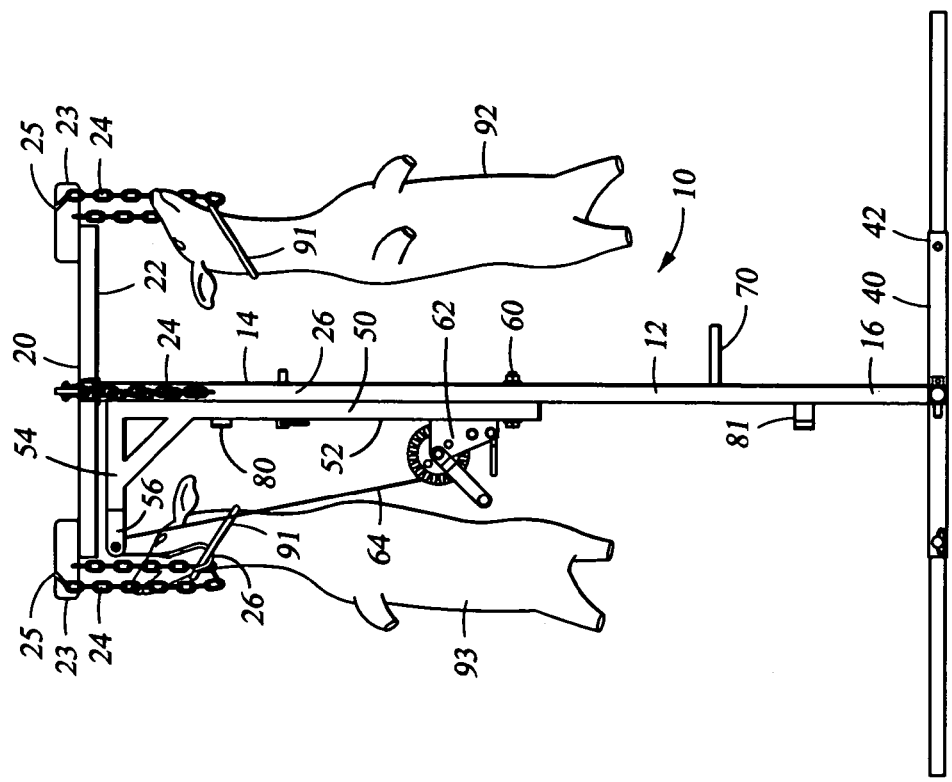
FIG. 5 is an elevational view of a second dismembered game being coupled to an open hanger after the first dismembered game awaits skinning.

FIG. 5 is an elevational view of the first dismembered game 92 being coupled to the hanger assembly 20 of the game gallows 10 for skinning. The first dismembered game 92 is lifted high enough to allow the user to pull the chain 24 through the collar 91 and to insert a link of the chain 24 into the link channel 25 of the chain plate 23 as shown in FIG. 5. Once the weight of the first dismembered game 92 is supported by the chain 24, the hanger 22 and the hanger assembly 20, the hook 26 and the strap 64 can be disengaged from the collar 91. The hanger assembly 20 can then rotate to remove the killed game 92 from the lift zone.

Figure 6:
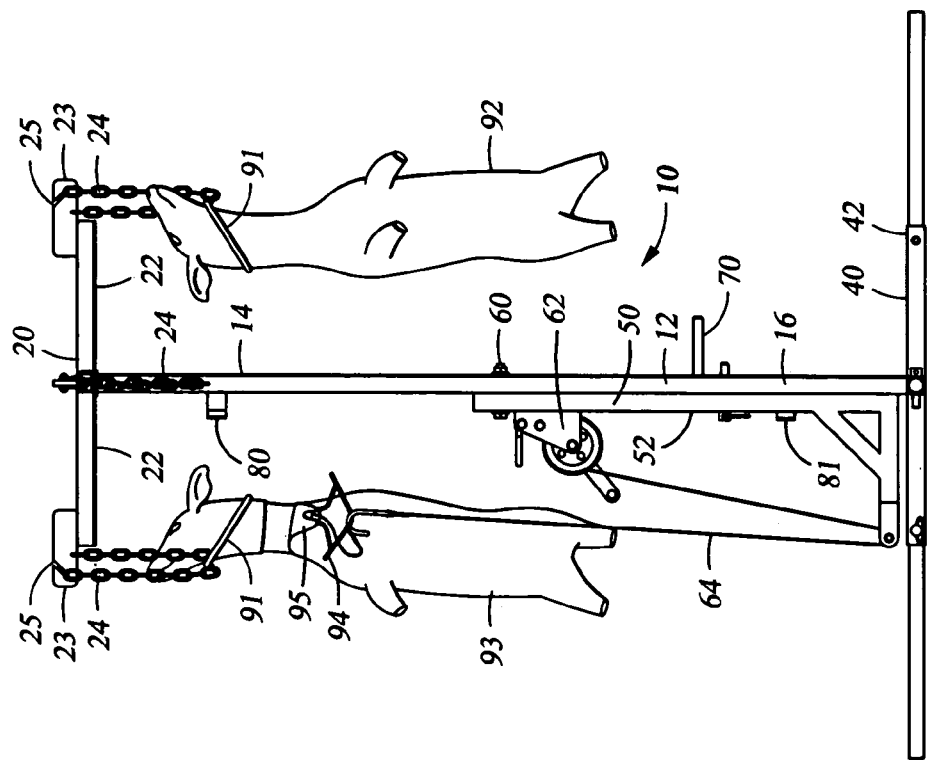
FIG. 6 is an elevational view of the game gallows of the present invention with the pulley arm in the skinning position and the strap coupled to the skin of a game.

FIG. 6 is an elevational view of one embodiment of the game gallows 10 of the present invention with a second dismembered game 93 secured to the hanger assembly 20 and the pulley arm 50 rotated to the skinning position. The first dismembered game 92 is shown to have been moved to the right by rotation of the hanger assembly 20. The strap 64 and hook 26 are coupled to the skin of the second dismembered game 93 using a collar 91. The hook 26 and the strap 64 are secured to a flap 95 of the skin of the second dismembered game 93 using a skinning tool 94. The operation of the winch 62 reels in and produces tension in the strap 64 enabling the user to forcibly pull the flap 95 and skin the second dismembered game 93.

Figure 7:
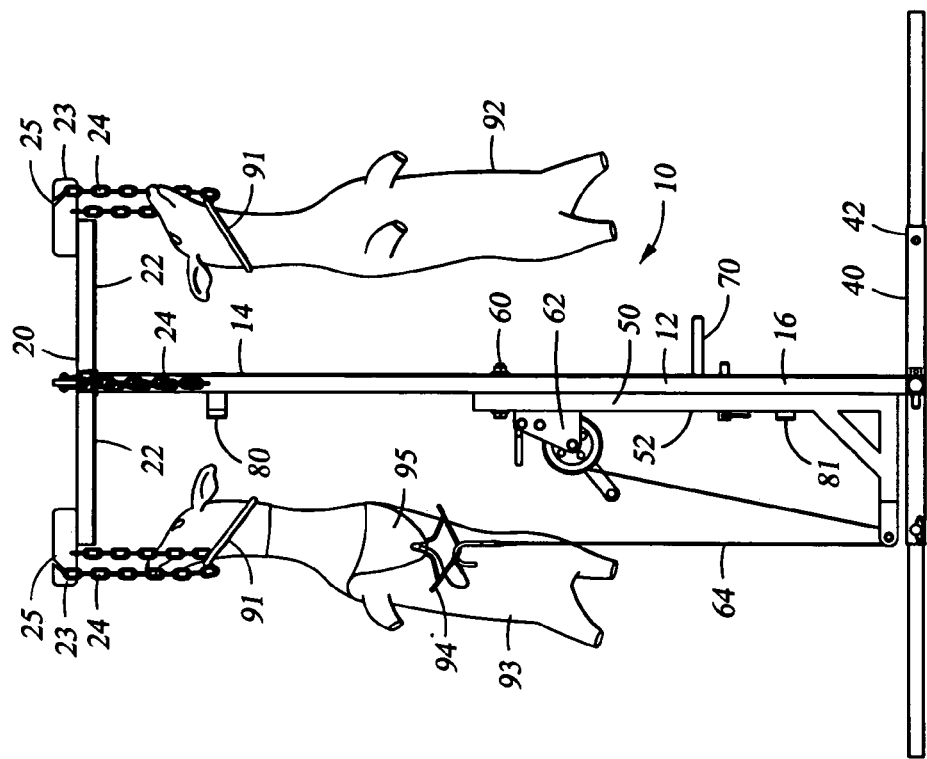
FIG. 7 is an elevational view of the game gallows of the present invention with the winch being used to skin a game.

FIG. 7 is an elevational view of one embodiment of the game gallows 10 of the present invention with the winch 62 being used to skin the second dismembered game 93. The flap 95 of the second dismembered game 93 grows larger as the winch 62 is turned to pull the strap 64 and skin the second dismembered game 93.

It will be understood from the foregoing description that various modifications and changes may be made in the preferred and alternative embodiments of the present invention without departing from its true spirit. For example, the game gallows is shown in the drawings as free standing, but is easily adapted for being tree-depending or vehicle depending. For tree depending, the support 12 may be secured to a tree or post using straps, bands or clamps, or any of the other devices used to secure items to trees or posts that are known in the prior art. The device disclosed above and shown in FIGS. 1–7 can be adapted to make a tree depending game hoist by providing an offset between the axis of the rotating hanger assembly 20 and the support 12. For vehicle depending, the radially outwardly extending leg 42 (see FIG. 1) that is opposite the pulley arm 50 may be inserted into a receptacle, such as a standard 1½ inch square or 2 inch square standard trailer hitch. This enables the user to winch a game, couple the game to a hanger 22, and rotate the hanger assembly 20 to position the game over the bed of a truck or other cargo surface of a vehicle, then use to winch 62 to lower the game onto the truck bed or cargo surface.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A gallows for hoisting and skinning game comprising:
    a support having a first end and a second end;
    a hanger assembly rotatively coupled to the support and having a plurality of radially outwardly extending hangers, each for supporting a game;
    a pulley arm having a first leg and a second leg, the first leg being pivotally coupled to the support between the first end and the second end of the support, the pulley arm having a first position for hoisting game and a second position for skinning game;
    a pulley coupled to the second leg of the pulley arm, the pulley being securable adjacent to the hanger assembly when the pulley arm is secured in its first position and the pulley being securable adjacent to the ground with the second leg when the pulley arm is secured in its second position;
    a winch secured to the first leg of the pulley arm; and
    a strap operatively engaging the winch and threaded around the pulley for pulling a load in a generally vertical direction, wherein the strap can be secured to a game with the pulley arm in the first position for hoisting the game to an elevated position adjacent to the hanger, and wherein the strap can be secured to the skin of the game with the pulley arm in the second position for skinning the game.

2. A game gallows for hoisting and skinning a game comprising:
    a support;
    a rotatable pulley arm having a first leg and a second leg, the first leg being pivotally coupled to the support between a first end and a second end of the support, the pulley arm having a first position for hoisting game and a second position for skinning game;
    a winch secured to the first leg of the pulley arm; and
    a pulley coupled to the second leg of the pulley arm, the pulley being at an apex when the pulley arm is secured in the first position and the pulley being opposite the apex and adjacent to the around when the pulley arm is secured in the second position.

3. The game gallows of claim 2 wherein the support is a tree.

4. The game gallows of claim 2, wherein the support is a free standing member.

5. The game gallows of claim 2, further comprising:
    a flexible tether operatively engaging the winch and threaded around the pulley for pulling a load in a generally vertical direction, wherein the flexible tether can be secured to a game with pulley arm in the first position for hoisting the same to an elevated position, and wherein the flexible tether can be secured to the skin of the game with the pulley arm in the second position for skinning the game.

6. The game gallows of claim 2, wherein flexible tether is selected from a rope, strap, wire, cable or chain.

7. The game gallows of claim 2, further comprising:
    a hanger assembly coupled to the support and having a plurality of radially outwardly extending hangers, each for supporting a game, wherein the pulley is adjacent to the hanger when the pulley are is secured in the first position.

8. The game gallows of claim 7, wherein the hanger assembly is rotatably coupled to the support.

9. The game gallows of claim 8, further comprising:
    a base adapted for providing vertical stability to the support.

10. The game gallows of claim 9, wherein the base comprises a plurality of radially outwardly deployable extensions.

11. The game gallows of claim 2, wherein the support is an elongated tubular member.

12. The game gallows of claim 9, wherein the base is adapted for being received into the towing hitch on a motor vehicle.

* * * * *